UNITED STATES PATENT OFFICE.

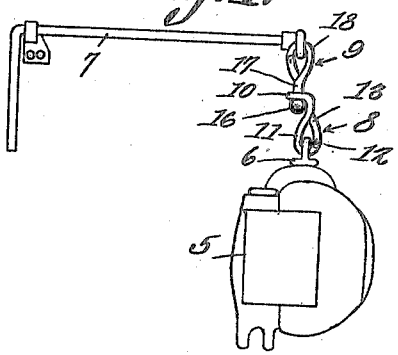
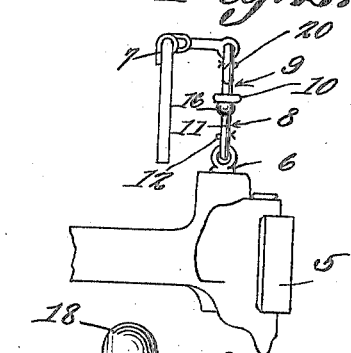
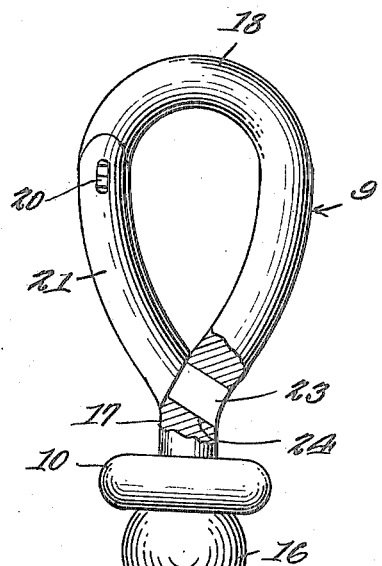
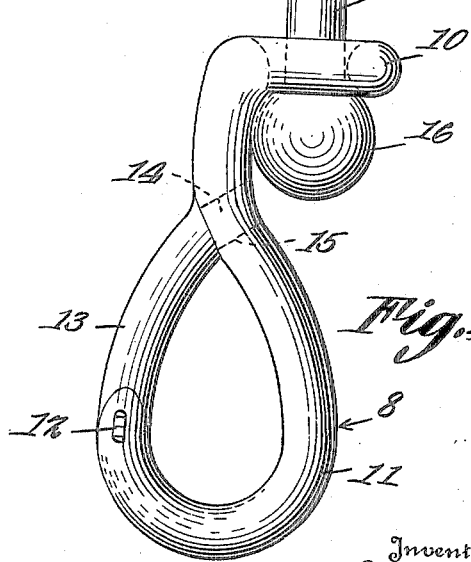

MAURICE LEWIS, OF PADUCAH, KENTUCKY.

SWIVEL-CHAIN.

1,273,241.

Specification of Letters Patent.   Patented July 23, 1918.

Application filed September 20, 1917.   Serial No. 192,338.

*To all whom it may concern:*

Be it known that I, MAURICE LEWIS, a citizen of the United States of America, and resident of Paducah, in the county of McCracken and State of Kentucky, have invented certain new and useful Improvements in Swivel-Chains, of which the following is a specification.

This invention relates to pin lifting or latch lifting connecting links for car couplings and particularly to novel means whereby a loose flexible and detachable member or members may be interposed between the pin and the pin operating lever of a car coupler.

An object of this invention is to provide links which are loosely joined together and which have means of attachment with an operating lever and a pin of a draw head or coupling head respectively.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a view in elevation of the links embodying the invention;

Fig. 2 illustrates a view in elevation at right angles to that shown in Fig. 1;

Fig. 3 illustrates an enlarged detail view of the links with the upper portion in a position at right angles to that shown in Fig. 2;

Fig. 4 is an enlarged detailed view of the link in a position at right angles to that shown in Fig. 3.

In these drawings 5 denotes any suitable type of draw head, 6 the link or latch which is employed for holding the coupling heads in operative relation to each other. A link operating lever 7 is of a type which may be operated from the side of a car and may represent any of the well known types of pin operating mechanism.

The connection between the lever and the pin in the present embodiment of the invention comprises two links 8 and 9, one of which has an eye 10 standing at an angle to the longitudinal axis of the link. The link 8 in addition to the portion which forms the eye has a curved main portion 11, a transverse aperture to receive the pin 12 and a detachable portion 13 which is secured to the main portion by the said pin 12 and by having a shank 14 seated in an aperture 15 in the said link so that when the shank is in the aperture and the pin 12 is in the apertures of the removable portion of the link and in the main portion thereof, a complete link is formed which may engage the pin or latch of a car coupler.

The link 9 which coacts with the link just described is provided with a ball 16 on the end of the shank 17 and the shaft extends through the aperture or eye 10 and thereby the two links are loosely connected. The link 9 has a curved portion 18 and an aperture 19 for the reception of a pin 20 by which the removable portion 21 of the link is connected to the main portion, it being understood that the pin 20 passes through an aperture 22 of the removable portion of the link and that the said removable portion has a shank 23 seated in an aperture 24 at the junction of the shank and curved portion of the link 9 and the said link 9 is intended to be connected to the lever 7 by which the pin or latch is elevated to permit the separation of the draw heads of couplers. By reason of the fact that the links have removable sections, the links may be readily assembled with relation to each other and they are renewable to supply impaired or broken parts, so that the links are not only durable, but are comparatively inexpensive to maintain, since they are so easily repaired.

I claim—

1. In a swivel chain comprising links, each link having a shank with a seat therein, a loop on one end of the shank having a section of the said loop adapted to be removed, an extension on one end of the section adapted to enter the seat in the shank, means for detachably connecting the said section, and means for connecting the links.

2. In a swivel chain comprising links, each of said links having a shank with a seat therein, an eye on one end of the shank of one link and at right angles thereto, adapted to receive the shank of the companion link, the other link having an enlargement on one end to prevent its withdrawal from the eye, a loop on the other end of the shank having a section of the loop adapted to be removed, an extension on one end of the section adapted to enter the seat in the shank, and means for detachably connecting the section to the loop.

MAURICE LEWIS.